United States Patent
vonMeier

[11] Patent Number: 5,531,891
[45] Date of Patent: Jul. 2, 1996

[54] PRE-SEPTIC TANK FLUID FILTER

[76] Inventor: James J. vonMeier, 14622 - 268th Ave., Zimmerman, Minn. 55398

[21] Appl. No.: 389,266

[22] Filed: Feb. 16, 1995

[51] Int. Cl.$^6$ .......................... B01D 35/02; B01D 27/00
[52] U.S. Cl. .......................... 210/251; 210/452; 210/453; 210/474; 210/460; 210/232; 210/456; 68/18 F
[58] Field of Search .................... 210/448, 456, 210/474, 477, 232, 323.2, 295, 306, 308, 309, 452, 453, 474, 251, 460; 134/153; 55/361, 368; 68/12.13, 18 F, 18 FA

[56] References Cited

U.S. PATENT DOCUMENTS

| | | | |
|---|---|---|---|
| 1,130,114 | 3/1915 | Small | 55/368 |
| 2,910,717 | 11/1957 | Raymond | 210/448 |
| 3,594,992 | 7/1971 | Carr et al. | 55/368 |
| 3,769,818 | 11/1973 | Smith | 210/409 |
| 3,804,258 | 4/1974 | Okuniewski et al. | 210/460 |
| 3,945,925 | 3/1976 | Nicholson, Jr. | 210/448 |
| 4,081,975 | 4/1978 | Wortham et al. | 68/18 FA |
| 4,322,293 | 3/1982 | Morgan, Jr. | 210/232 |
| 4,906,367 | 3/1990 | Villagomez | 68/18 F |
| 4,966,701 | 10/1990 | Goodman et al. | 210/448 |
| 4,986,912 | 1/1991 | Fisch | 210/448 |
| 5,006,243 | 4/1991 | Arnaud | 210/448 |
| 5,242,588 | 9/1993 | Reese | 210/238 |
| 5,350,526 | 9/1994 | Sharkey et al. | 210/332 |

*Primary Examiner*—Ana Fortuna
*Attorney, Agent, or Firm*—Nawrocki, Rooney & Sivertson

[57] ABSTRACT

A pre-septic tank or washing machine output filter apparatus for the improved removal of contaminants from pre-septic fluids. A filter apparatus defining a fluid filter chamber has an input port and an output port. A fluid deflector or disperser is mounted to deflect substantially all of the contaminated fluid entering the filter apparatus. A filter is mounted within the filtering chamber and has a closed lower portion and an upper portion for receiving the fluid dispersal apparatus. Fluid entering the input port is dispersed by the deflector apparatus through an upper portion of the filter, thence through the fluid filter chamber to the fluid output port. Contaminants collected in the upper portion of the filter from the deflected fluid will eventually be caused by gravity to fall to the lower, closed portion of the filter where these contaminants will remain collected until the filter is emptied. Thus a high percentage of undesirable contaminants, such as synthetic materials lint will be prevented from reaching and blocking the septic system or other sewage system.

11 Claims, 3 Drawing Sheets

PRE-SEPTIC TANK FLUID FILTER

BACKGROUND OF THE INVENTION

1. Field of the Invention

The present invention relates generally to fluid filters; more particularly to pre-septic tank fluid filters; and, still more particularly to filters for the output of washing machines.

2. Description of the Prior Art

The need for pre-septic tank filtration was broadly recognized in the prior art. This need arises particularly due to the fact that contaminated groundwater, that is well water, has been the cause of approximately half of the water-borne disease outbreaks in the United States since approximately 1920. The majority of these outbreaks were known to be caused by pathogenic microorganisms. The United States Environmental Protection Agency has found that failed septic systems are the most frequently-reported cause of groundwater contamination. One out of every four households in the United States is on a septic system, according to the 1990 census bureau, and these households generate over one trillion gallons of waste water every year.

Over 100 disease-causing viruses are known which can be introduced into water supplies through failed septic systems. The effects of these viruses may range from intestinal upset to severe respiratory and central nervous system disorders, as well as death. A properly operating septic system will treat and destroy these dangerous contaminants before they can be introduced to the groundwater supplies. However, a septic system can begin to lose its efficacy in the treatment of disease-carrying effluent in as little as three years.

Once a septic system fails to treat raw sewage, not only the immediate groundwater supplies, but also the surrounding soil will become contaminated. It is possible for homes and entire neighborhoods, particularly lakeshore properties, to lose by far the greater part of their value because of contamination from failed septic systems.

With increasing recognition of this groundwater contamination problem, several states have begun to enact strict laws governing septic systems, and the United States Congress is reviewing the 1994 Clean Water Act with a view to a new focus on home septic systems.

It has been generally believed in the prior art that clothes washing machines are a leading cause of septic failure, even in well-maintained septic systems, and it was generally believed that this was because of the large amount of water used by such machines. However, a five and one-half year research study conducted by the inventor of the present invention on the effects of washing machine discharge on septic systems altered the prior art general knowledge by revealing previously unknown facts, including the facts that: A huge amount of material fibers, that is lint, are being discharged by washing machines; and, this discharge includes a large number of synthetic fibers.

It has been found that an average household will introduce over 250 square feet of lint into their septic system through their washing machine alone, each year. Prior art lint screens and nylon socks trap less than 5% of this debris. This lint, or material fibers, enters the septic system dispersion field and plugs the pores of the soil bed. Further, the problem is compounded because much of the clothing being washed by the machines is made of synthetic materials, such as polyester, nylon, and the like. The abovementioned study has found that septic systems will not break down synthetic substances, and that once these contaminants enter the septic system there is no reasonable way to remove them.

During the above-described research study, data was complied over a five and one-half year test period. Tests were conducted in residential settings with households ranging from two to six occupants using standard washing machines. It was discovered that laundering habits and materials were strikingly similar in all test households. It was found that Saturdays and Sundays were the heaviest wash load days of the week, and as many as 12 wash loads were done in one day. The months of May through October saw the heaviest non-stop usage of the washing machines during these weekends. Over 80% of wash loads were done on full load settings using from approximately 47 to 62 gallons for a complete cycle. Discharge rates from the washing machines averaged 17 to 19 gallons per minute.

By using a 30 micron filter, it was possible to ascertain the types and amounts of solids being discharged from the machines. The amount of solids varied with the types of material being washed, however, the average solid discharge, based on one-week cycles, was 62.60 square inches per wash load. This is a significantly larger amount than was previously assumed by the prior art. Assuming that each wash discharges 60 gallons of water including an amount of solids equal to 62.60 square inches, the annual load on a septic system from just one such washing machine would amount to 37,440 gallons of water and 260 square feet of solids.

The contaminant solids are comprised of 91% organic and non-organic material fibers, that is lint. The remainder of the solids generally comprises approximately 7% hair or pet fur and 2% miscellaneous debris such as sand, clay and the like. Conventional prior art lint screens and nylon socks remove less than 5% of these contaminants. The majority of the material fibers found in the contaminant solids measured one-eighth inch or less. The percentage of synthetics ranged from 20% to over 70% per wash load. Further, it was found that once introduced into the septic tank over 80% of these materials remained in suspension and were flushed out into the drain field from the septic system where an undesirable phenomenon was observed. These minute particles tended to congregate in common areas. These fibers would interlock, forming a mat-like barrier which plugged the pores of the gravel and soil bed. An analysis of failed septic systems shows that they contain large pockets of these mat-like barriers from contaminants throughout the drain field. It was also found that these materials were a leading cause of sewer pipe restrictions and obstructions. Lint would attach itself to grease and/or fats in the pipe creating a dam effect that would, in turn, trap additional grease or fats. This cycle continues to eventually cause a total obstruction of the pipe.

Though a normal septic system will break down organic fibers, such as cotton and wool fibers, in a reasonable period of time, it has been found that due to the lack of ultraviolet light, the septic system does not operate to break down the synthetic fibers. Such synthetic fibers have been shown to be existent in the septic system for periods of greater than 20 years without breaking down. This fact makes obvious the value of preventing the synthetic fibers from entering the septic system, that is, pre-filtering the liquid which carries the synthetics into the system. As stated above, prior art pre-septic filtering systems, including washing machine filters, do not in general remove a sufficiently high percentage of the lint and other debris which carries synthetic fibers into the septic system.

SUMMARY OF THE INVENTION

The present invention overcomes the disadvantages found in the prior art by providing a pre-septic or washing machine fluid filter of a unique design. Briefly described, the apparatus of this invention comprises a filter apparatus including a filter chamber having a fluid input port and a fluid output port. Within the filter chamber there is placed a filter, preferably of 200 microns or less filtering size, having a closed lower end and an upper end adapted to receive the fluid discharge such as from a clothes washing machine. A fluid disperser or deflector causes water or other fluid flowing through the input port to be dispersed through the upper portion of the filter. The fluid passes through the upper portion of the filter into the filter chamber and thence out through the fluid outlet port. The materials filtered from the input fluid are caught by the upper portion of the filter and are eventually caused by gravity to fall into the lower closed portion of the filter. These gravity-collected contaminants are not exposed to another flushing of fluids, because of the deflection and/or dispersal of the input fluids through the upper portion of the filter. Therefore, the gravity-collected contaminants will remain within the filter until such time as the filter is removed and deliberately emptied into a desirable collection place. By thus removing a much higher percentage of contaminants from pre-septic fluids such as washing machine discharges, a large number of effective years of use can be added to a septic system.

BRIEF DESCRIPTION OF THE DRAWINGS

Other objects of the present invention and many of the attendant advantages of the present invention will be readily appreciated as they become better understood by reference to the following detailed description when considered in connection with the accompanying drawings, in which drawings like reference numerals designate like parts through the figures thereof and wherein.

DETAILED DESCRIPTION OF THE PREFERRED EMBODIMENTS

Figure 1:
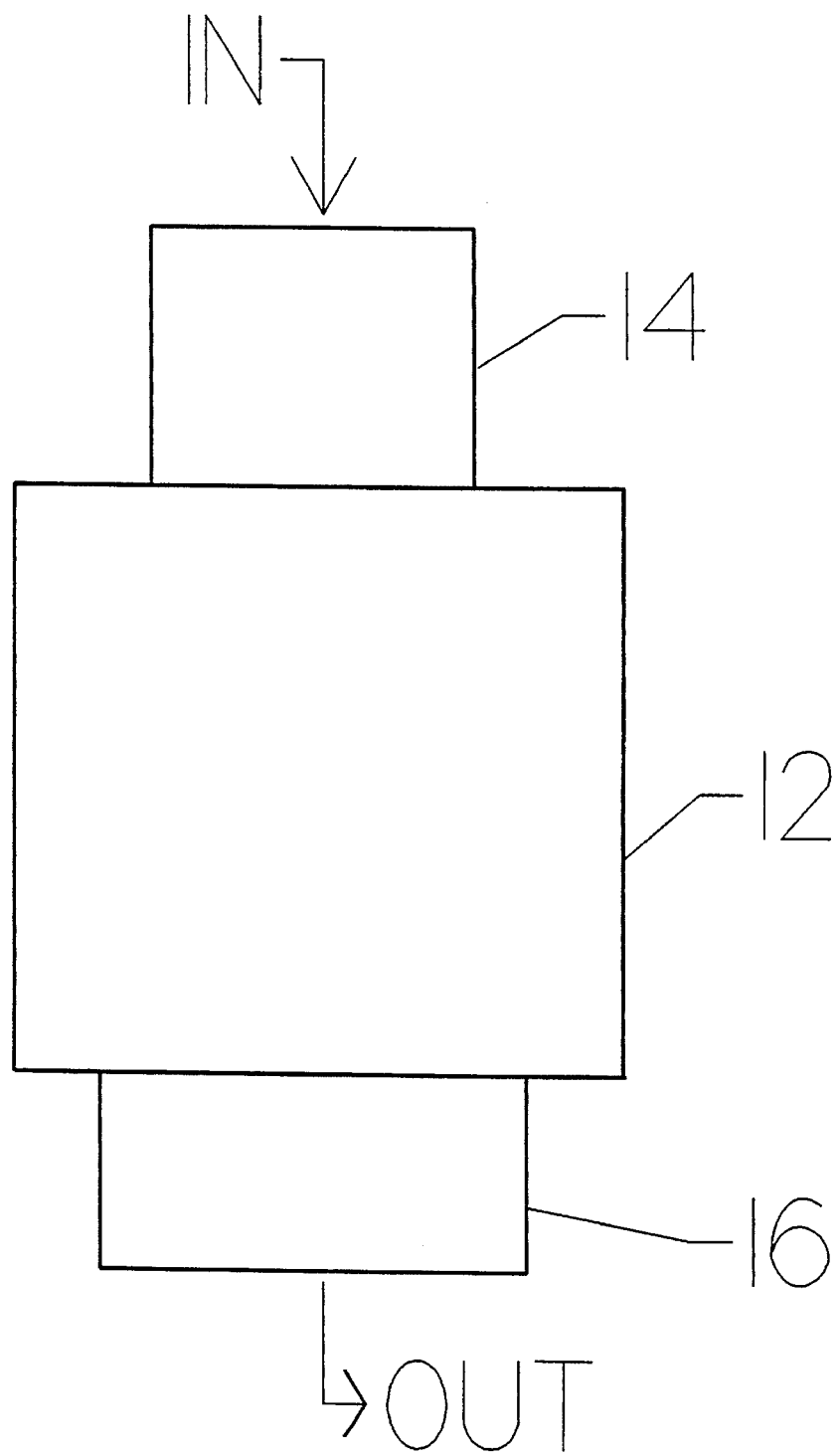
FIG. 1 is a plane side view of a filter apparatus.

FIG. 1 discloses a filter apparatus comprising a filter chamber 12 having an input port 14 and an output port 16. This pre-septic filter apparatus may be attached to the output of a clothes washing machine. Thus input port 14 would be connected such that the fluid output from the washing machine would enter port 14 in the manner designated by the arrow. This discharge fluid would impact on a fluid deflector or dispersion device and filter to be shown and described below, the filter being located in chamber 12. After passing through the filter, the decontaminated fluid would pass through output port 16 to a septic system in the path shown by the arrow in FIG. 1.

Figure 2A:
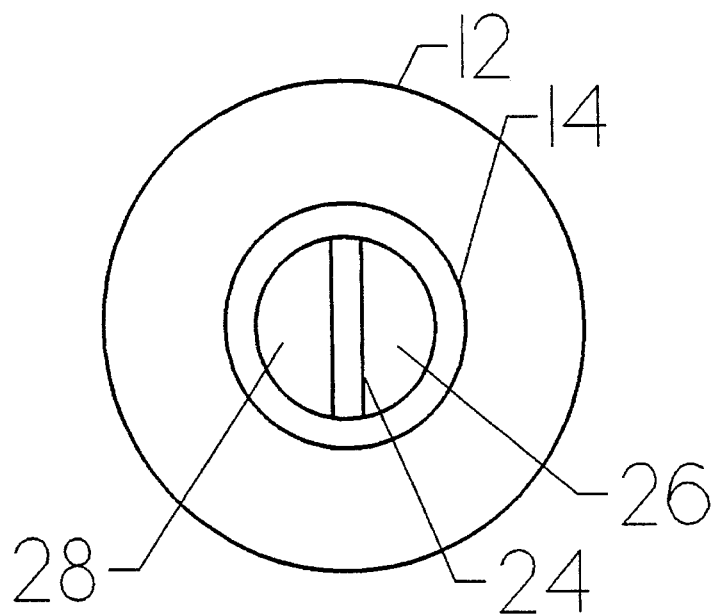
FIG. 2a is a top view of the filter apparatus of FIG. 1.

FIG. 2a is a top view of the apparatus of FIG. 1. Here filter apparatus 12 is shown in its top view, including a top view of input port 14. It can be seen that within port 14 there is mounted a fluid deflector or dispersion device 24, including a pair of deflector vanes 26 and 28 placed to substantially deflect all of the fluid entering port 14.

Figure 2B:
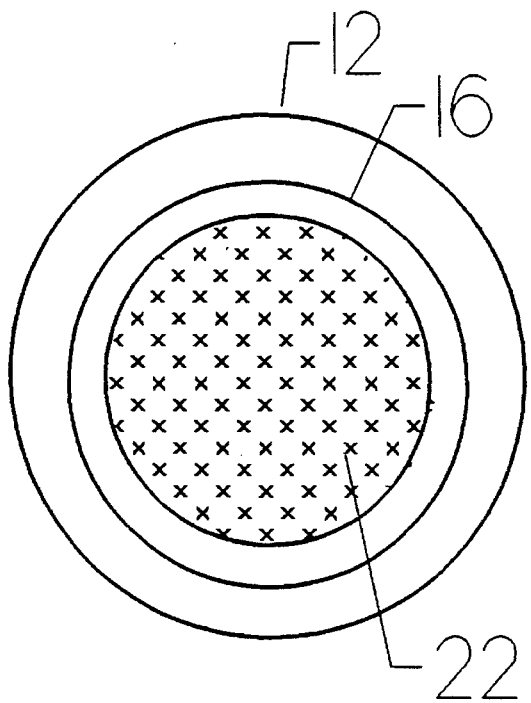
FIG. 2b is a bottom view of the filter apparatus of FIG. 1.

FIG. 2b is a bottom view of the apparatus of FIG. 1 which again shows filter apparatus 12 defining a filter chamber. On the bottom of Filter 12 is an output port 16. Through output port 16 it can be seen that a filter 22 is mounted in the filter chamber defined by apparatus 12. In FIG. 2b filter 22 is shown by x-hatching.

Figure 3:
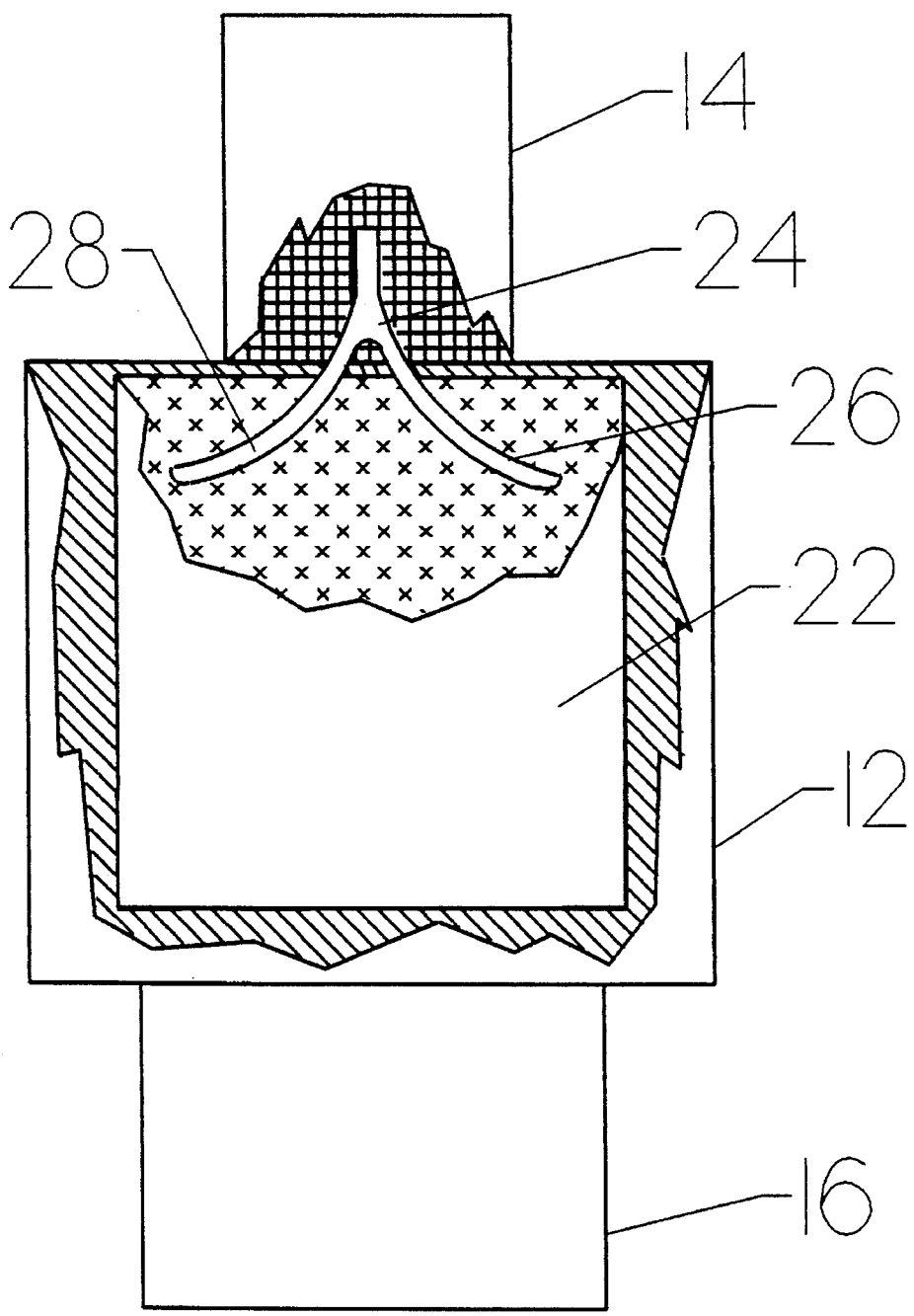
FIG. 3 is a section view of the apparatus of FIG. 1 revealing inside portions of the apparatus of FIG. 1.

Referring now to FIG. 3, it can be seen through a sectioning of input port 14 that fluid deflector or disperser 24 includes a pair of fluid deflecting or dispersing vanes 26 and 28 are mounted within port 14 so as to effectively or substantially disperse all of the contaminated fluid entering port 14 from a washing machine or the like.

FIG. 3 also shows through a sectioning of filter apparatus 12 that apparatus 12 forms a fluid chamber in which there is mounted a filter 22. Filter 22 has a closed lower portion, and an upper portion which is open to receive deflection vanes 26 and 28 of deflection device 24, as can be seen through the sectioning of filter 22. Filter 22 is preferably of a material for filtering sizes of materials of 200 microns or less, and may comprise a closed bottom cylinder having an open end for receiving vanes 26 and 28 and fluid which impinges thereon, or may be a more bag-like structure. No matter the structure of filter 22, it is important that it be mounted such that water or other fluid dispersed by vanes 26 and 28 will pass through an upper portion of filter 22 into the fluid chamber defined by apparatus 12 and thence through output port 16 to the septic system or other drainage path.

Lint and other contaminants will be collected from the fluid deflected through the upper portion of filter 22 by vanes 26 and 28. These contaminants which have been removed from the fluid will be pulled by gravity into the lower closed portion of filter 12, particularly when the fluid flow has stopped and the contaminants begin to dry. Because substantially no fluid passes through the lower portion of filter 22, the gravity-collected contaminants will remain in the lower portion until such time as filter 22 is deliberately removed from the chamber formed by apparatus 12 and emptied into a more desirable location.

Of primary importance is the fact that this gravity-actuated collection of filtered materials remains in the lower portion of the filter until emptying and is not subjected to fluid pressure of any substantial amount. The result is that a much greater percentage of contaminants is prevented from reaching the septic system or other drainage or sewage output apparatus than with prior art washing machine filters or pre-septic system filters. This increased removal of contaminants, particularly of synthetic materials lint, will greatly add to the number of years of efficacy of the septic or other sewage system.

Having thus described the preferred embodiments of the present invention, those of skill in the art will readily appreciate that there may be other useful embodiments within the scope of the claims hereto attached.

What is claimed is:

1. Pre-septic tank filter apparatus comprising:

a structure defining a filter cavity, and having a fluid input port and a fluid output port;

a filter mounted in said cavity, and having an open upper portion and a closed lower portion; and, a fluid deflector having vanes fixedly mounted in said input port extending into said filter upper portion to deflect input fluid laterally through said filter upper portion into said cavity and to said output port, such that contaminants collected in said filter upper portion are attracted by gravity to said filter closed lower portion.

2. The apparatus of claim 1 in which said filter comprises a substantially cylindrical, semi-rigid body having an open upper end adapted to receive at least a portion of said fluid deflector and a closed lower end.

3. The apparatus of claim 2 in which said body comprises a filter material for blocking contaminants of 200 microns or less.

4. The apparatus of claim 1 in which said filter comprises a substantially flexible, bag shaped body having an upper end adapted to receive at least a portion of said fluid deflector and a closed lower end.

5. The apparatus of claim 4 in which said body comprises a filter material for blocking contaminants of 200 microns or less.

6. In a washing machine filter for filtering the discharge from a washing machine, said washing machine filter having a filter chamber including an input port for receiving contaminated fluid and an output port for passing filtered fluid, the improvement comprising:

a filter mounted in said filter chamber and having an open inner upper portion and a closed inner lower portion;

a fluid deflector having vanes fixedly mounted between said input port and said filter inner upper portion for deflecting substantially all fluid from said input port laterally through said filter upper portion to said output port; and, said filter closed inner lower portion mounted to collect by gravity all contaminants collected by said filter inner upper portion.

7. The apparatus of claim 6 in which said filter comprises a substantially cylindrical, semi-rigid body wherein said open upper portion is adapted to receive at least a portion of said fluid deflector.

8. The apparatus of claim 7 in which said body comprises a filter material for blocking contaminants of 200 microns or less.

9. The apparatus of claim 6 in which said filter comprises a substantially flexible, bag shaped body wherein said upper portion is adapted to receive at least a portion of said fluid deflector.

10. The apparatus of claim 9 in which said body comprises a filter material for blocking contaminants of 200 microns or less.

11. A filter apparatus comprising:

a structure defining a filter cavity, and having a fluid input port and a fluid output port;

a filter mounted in said cavity, and having an open upper end and a closed lower end and a side extending therebetween, said filter having a longitudinal axis extending from said open upper end to said closed lower end; and a fluid deflector having vanes fixedly disposed in said cavity and extending in said filter, said fluid deflector deflecting input fluid from said input port at an angle relative to said longitudinal axis such that said input fluid passed through said side of said filter into said cavity and to said output port, such that contaminants collected in said side of said filter are attracted by gravity to said filter closed lower end.

* * * * *